(12) United States Patent
Chew et al.

(10) Patent No.: US 7,853,595 B2
(45) Date of Patent: Dec. 14, 2010

(54) METHOD AND APPARATUS FOR CREATING A TOOL FOR GENERATING AN INDEX FOR A DOCUMENT

(75) Inventors: Susan C. Chew, Issaquah, WA (US); Patrick J. Eames, Newcastle, WA (US); Brent L. Hadley, Kent, WA (US)

(73) Assignee: The Boeing Company, Chicago, IL (US)

(*) Notice: Subject to any disclaimer, the term of this patent is extended or adjusted under 35 U.S.C. 154(b) by 288 days.

(21) Appl. No.: 11/668,523

(22) Filed: Jan. 30, 2007

(65) Prior Publication Data
US 2008/0184107 A1 Jul. 31, 2008

(51) Int. Cl.
*G06F 17/30* (2006.01)
(52) U.S. Cl. .................. 707/741; 707/711
(58) Field of Classification Search .............. None
See application file for complete search history.

(56) References Cited

U.S. PATENT DOCUMENTS

| 5,999,664 A * | 12/1999 | Mahoney et al. ........... 382/305 |
| 6,233,575 B1 | 5/2001 | Agrawal et al. |
| 6,263,121 B1 | 7/2001 | Melen et al. |
| 2005/0076295 A1 * | 4/2005 | Simske et al. ............... 715/517 |
| 2005/0246351 A1 | 11/2005 | Hadley et al. |
| 2005/0289161 A1 | 12/2005 | Hadley et al. |
| 2005/0289182 A1 * | 12/2005 | Pandian et al. ............ 707/104.1 |
| 2005/0289185 A1 | 12/2005 | Hadley et al. |
| 2005/0289447 A1 | 12/2005 | Hadley et al. |

FOREIGN PATENT DOCUMENTS

| EP | 1128278 A | 8/2001 |
| EP | 1288792 A | 3/2003 |

OTHER PUBLICATIONS

PCT International Search Report re: PCT/US2008/052406 (06-0675 PCT) of Jan. 8, 2008.

* cited by examiner

*Primary Examiner*—Mohammad Ali
*Assistant Examiner*—Syed H Hasan
(74) *Attorney, Agent, or Firm*—Law Office of Donald D. Mondul

(57) ABSTRACT

A method creating a tool for generating at least one index element for an examined document configured according to a format includes: (a) ascertaining at least one textual characteristic-set of an exemplary document configured according to the format for identifying the at least one index element; (b) expressing the at least one textual characteristic-set in a computer-executable code; and (c) saving the computer-executable code for effecting the creating.

17 Claims, 4 Drawing Sheets

METHOD AND APPARATUS FOR CREATING A TOOL FOR GENERATING AN INDEX FOR A DOCUMENT

FIELD OF THE INVENTION

The present invention is directed to an apparatus and method for treating documents, and especially to an apparatus and method for treating documents to generate an index relating to a treated document.

BACKGROUND

Recently businesses, individuals and other entities have increasingly used digitally-based information systems for documentation. By way of example and not by way of limitation, such digitally-based information may include aircraft maintenance manuals, parts catalogs or other documentation employed in lieu of traditional paper or microfilmed manuals or other documents. Many of the digitally-based information systems use an industry-standard Portable Document Format (PDF) for document storage. One benefit of storing documents formatted in PDF is that the documents so stored have a substantially fixed appearance regardless of the device used to render their display. Such uniformity of appearance may give documents the look and feel of paper versions of the documents.

However, as is the case when using paper documents, there may be no comprehensive index into the subject matter of a PDF document. This is a deficiency which detracts from the document's overall usability whether configured in paper form or configured as digitally-based information. A company may have a library that includes many thousands of documents in a digital format. Each document may be configured with its own respective layout and authoring idiosyncrasies. It could be an extremely difficult task to write and maintain all the software needed to extract appropriate data from so many varied digitally-formatted documents to build an index for each of those documents.

By way of example and not by way of limitation, the information needed to create a meaningful index for a maintenance document may be gleaned by examining three general parts of the document: titles, tables, and repeating text patterns. Certain textual characteristics (e.g., layout, capitalization and underlying patterns) of the document parts may be determined by examining a representative sample of their occurrences in an exemplary document configured using substantially the same digital format.

It would be useful to have a software tool to automatically extract and index the desired titles, tables, and other text patterns from the document. To build such an automatic indexing tool, it would be useful if only some knowledge of pattern recognition and regular expressions were required, but no specific computer programming skills were needed by a user. It would be useful if the tool can be automatically constructed from information entered by a user who is merely familiar with the contents of the document without having significant computer programming skills.

There is a need for a method and apparatus for automatically creating an index for a digitally-formatted document.

SUMMARY

A method creating a tool for generating at least one index element for an examined document configured according to a format includes: (a) ascertaining at least one textual characteristic-set of an exemplary document configured according to the format for identifying the at least one index element; (b) expressing the at least one textual characteristic-set in a computer-executable code; and (c) saving the computer-executable code for effecting the creating.

A method creating a tool for generating an index for an examined document, the examined document being configured according to a format, includes: (a) Ascertaining a first textual characteristic-set of an exemplary document for identifying a first index element for the index. The exemplary document is configured according to the format. (b) Expressing the first textual characteristic-set in a computer-executable code. (c) Saving the computer-executable code in a data store. (d) If another index element is desired for inclusion in the index, ascertaining a next textual characteristic-set and repeating claim 8 steps (b) through (c). (e) If no other index element is desired for inclusion in the index, terminating the method.

An apparatus creating a tool for generating at least one index element for an examined document configured according to a format includes: (a) an ascertaining unit operating with an exemplary document to ascertain at least one textual characteristic-set of the exemplary document. The at least one textual characteristic-set is related with the at least one index element. The exemplary document is configured according to the format. (b) An encoding unit coupled with the ascertaining unit. The encoding unit expresses the at least one textual characteristic-set in a computer-executable code. (c) A data store coupled with the encoding unit. The data store saves the computer-executable code for effecting the creating.

It is, therefore, a feature of embodiments of the present invention to provide a method and apparatus for automatically creating an index for a digitally-formatted document.

Further features of embodiments of the present invention will be apparent from the following specification and claims when considered in connection with the accompanying drawings, in which like elements are labeled using like reference numerals in the various figures, illustrating the preferred embodiments of the invention.

DETAILED DESCRIPTION

An embodiment of the method of the present invention permits automating the creation of systems which provide a consistent data identification and extraction of textual elements from general datasets in documents such as, by way of example and not by way of limitation, extracting XML based identities. One embodiment of the present invention is useful for extracting textual elements from documents configured according to a Portable Document Format (PDF). An embodiment of the present invention may provide a library of textual elements for the creation of "black box" processes to accurately identify, convert, extract, and store or otherwise deliver extracted textual information in eXtensible Markup Language (XML) format which is contained in current and archived documents such as, by way of example and not by way of limitation, documents configured using a Portable Document Format (PDF).

Figure 1:
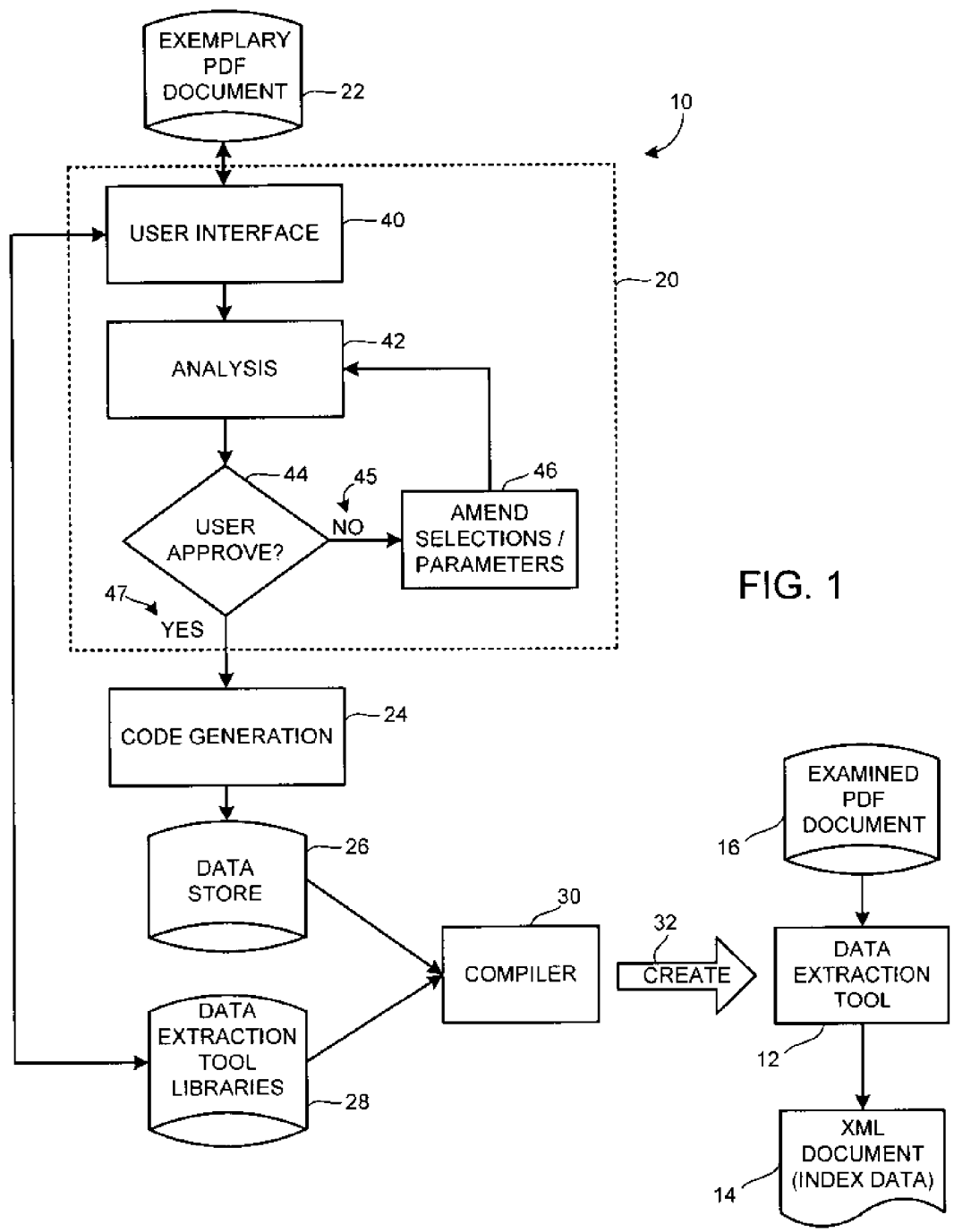
FIG. 1 is a schematic diagram of an embodiment of the present invention and its use with an examined document.

FIG. 1 is a schematic diagram of an embodiment of the present invention and its use with an examined document. In FIG. 1, an apparatus 10 is illustrated. Apparatus 10 may be used with an exemplary document 22 to create a tool 12 for generating an index 14 for an examined document 16.

Apparatus 10 may include an ascertaining unit 20 coupled for examining exemplary document 22, an encoding unit 24 coupled with ascertaining unit 20, a data store 26 coupled with encoding unit 24 and a compiler unit 30 coupled with data store 26. A library data store 28 may also be coupled with ascertaining unit 20 and with compiler unit 30. Compiler unit 30 may employ data from at least one of data store 26 and library data store 28 to create data extraction tool 12, as indicated by an arrow 32. Library data store 28 may contribute directly to compiler 30 for using tool 12 to effect creation of index 14 by providing stored format attributes specifically related to the format with which apparatus 10 is dealing in connection with documents 22, 16.

Data extraction tool 12 may be employed with an examined document 16 to generate an index 14. Examined document 16 may preferably be configured in substantially a similar format to the format in which exemplary document 22 is configured. By way of example and not by way of limitation, in the exemplary embodiment of the present invention represented in FIG. 1, both documents 16, 22 may be configured as Portable Document Format (PDF) documents. By way of example and not by way of limitation, index 14 may be presented in a documentary paper form or in an on-line data form, presented in both a documentary form and an on-line form or presented in another form.

Ascertaining unit 20 may include a user interface unit 40 coupled for examining exemplary document 22 and coupled with library data store 28. An analysis unit 42 may be coupled with user interface unit 40. User interface unit 40 may preferably assist a user in identifying one or more examples of index elements in exemplary document 22 which are relevant to creating an index for exemplary document 22. Such index elements may include, by way of example and not by way of limitation, titles, tables, and text patterns in the exemplary document. Text patterns may include text strings identifiable as part numbers, drawing reference numbers or similar text patterns. It is preferred that more than a simple text-string analysis be performed to effect recognizing a text pattern. Text patterns may preferably involve a plurality of textual characteristics described in a textual characteristic-set. A textual characteristic-set may include, by way of example and not by way of limitation, textual attributes such as font, placement on a page, surrounding textual patters or other textual attributes associated with a text string.

Each title, table, text pattern or other index element identified by the user may be assigned a category, which may be referred to as a "document-object type". The document-object types for any given document may be determined by a user and are preferably assigned meaningful names such as, by way of example and not by way of limitation, Section-Title (a title object), Task-Title (a title object), Alert-Msg-Table (a table object), Fault-Code-Table (a table object), Part-Number (a text pattern object), and Document-Reference (a text pattern object).

In addition to index elements of a document, such as titles, tables, and text pattern objects, a user may also identify container objects in the document. Container objects may be used to define any hierarchies which may exist among index elements. By way of example and not by way of limitation, a Task-Title may be found inside a contiguous unit of text called a Task, a Section-Title may be found inside a contiguous unit of text called a Section, and a Task may be found within the boundaries of a Section. In such an arrangement of a document, Task and Section may be defined as container objects; Section may be defined as containing the sub-objects Section-Title and Task; Task may be defined as containing the sub-object Task-Title.

Analysis unit 42 may examine and analyze user-supplied instances of each document-object type and makes generalizations about how similar instances may be recognized. Analysis unit 42 may examine the exemplary document-object instances identified by a user as being extant in exemplary document 22 and makes inferences regarding the characteristics presumed to be common to all occurrences of that object type. The inferences may be encoded as regular expressions, True/False switches, table-attribute-data or in another objectively expressed form to provide the information needed to recognize the document-object occurrences. By way of example and not by way of limitation, inferences may be treated by code generation unit 24 for expression as VB.net (Virtual Basic) source code which, when executed, may locate and extract all occurrences of all specified document-objects from an examined document configured in substantially the same format as exemplary document 22.

Conclusions drawn by analysis unit 42 may be based solely on document-object instances provided by a user. Because the process of making inferences is an inexact activity, conclusions drawn by analysis unit 42 may or may not be accurate. To maximize the accuracy of the conclusions drawn, a user may be permitted to interactively review the results of conclusions drawn by analysis unit 42 prior to treatment by encoding unit 24 so that a user may correct any erroneous information or conclusion.

A decision unit 44 may be coupled with analysis unit 42. Decision unit 44 may indicate a response to whether a user approves of a selected identified index element. If decision unit 44 indicates that a user does not approve of a selected identified index element, a NO indication 45 may be generated by decision unit 44 and the user may employ an amending unit 46 to effect amending of selections or parameters associated with the selected index element. The amended selections or parameters may be employed by analysis unit 42 to amend the selected index element for another review by a user.

If decision unit 44 indicates that a user approves of a selected identified index element, a YES indication 47 may be generated by decision unit 44 and the selected identified index element may be treated by encoding unit 24 for presenting a source code expression of the selected identified index element for storage in data store 26. Encoding unit 24 may generate compilable source code for saving in data store 26. When executed the saved source code may recognize and extract all instances of identified document-objects from any document (such as examined document 16) configured in a format substantially similar to exemplary document 22.

Data extraction tool 12 may be employed to extract from any examined document 16 configured substantially in the same format as exemplary document 22 any text occurrences of the specified document objects. Data extraction tool 12 may create an index file 14 (preferably formatted in eXtensible Markup Language (XML)). XML is an industry-standard general-purpose markup language. Index file 14 may contain title, table, and text pattern occurrences, each tagged with the name of its assigned document-object type. Container objects and the corresponding document-object hierarchy may be represented in index file 14 as XML elements and sub-elements.

Figure 2:
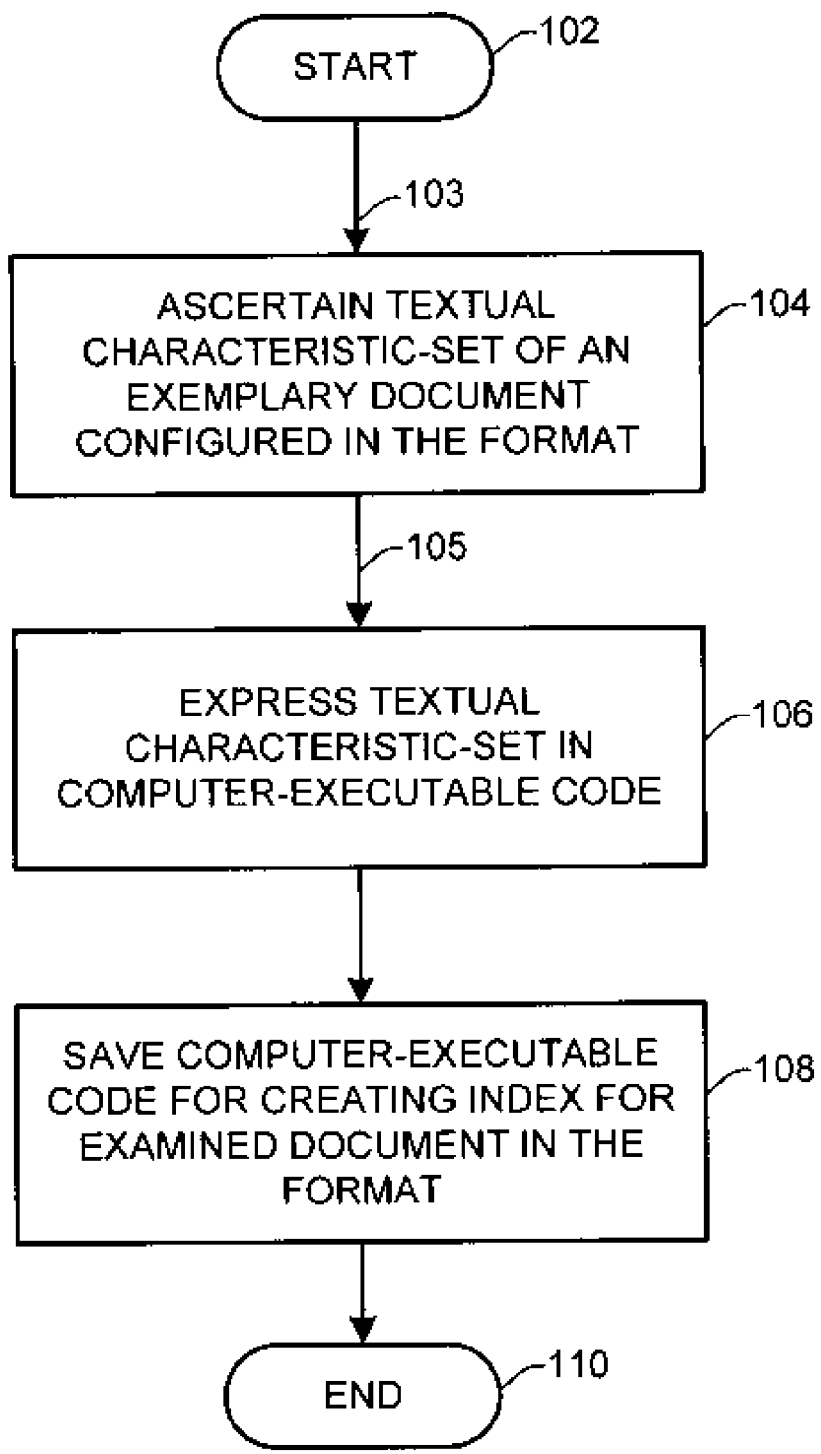
FIG. 2 is a flow chart illustrating an embodiment of the method of the present invention.

FIG. 2 is a flow chart illustrating an embodiment of the method of the present invention. In FIG. 2, a method 100 creating a tool for generating at least one index element for an examined document configured according to a predetermined format may begin at a START locus 102. Method 100 may continue with ascertaining at least one textual characteristic-set of an exemplary document for identifying the at least one index element, as indicated by a block 104. The exemplary document is preferably configured according to the predetermined format. Method 100 may continue with expressing the at least one textual characteristic-set in a computer-executable code, as indicated by a block 106. Method 100 may continue with the step of saving the computer-executable code for effecting the creating, as indicated by a block 108. Method 100 may terminate at an END locus 110.

An ascertaining process effected according to block 104 between process loci 103, 105 may be carried out in at least two ways, as described below in connection with FIGS. 3 and 4.

Figure 3:
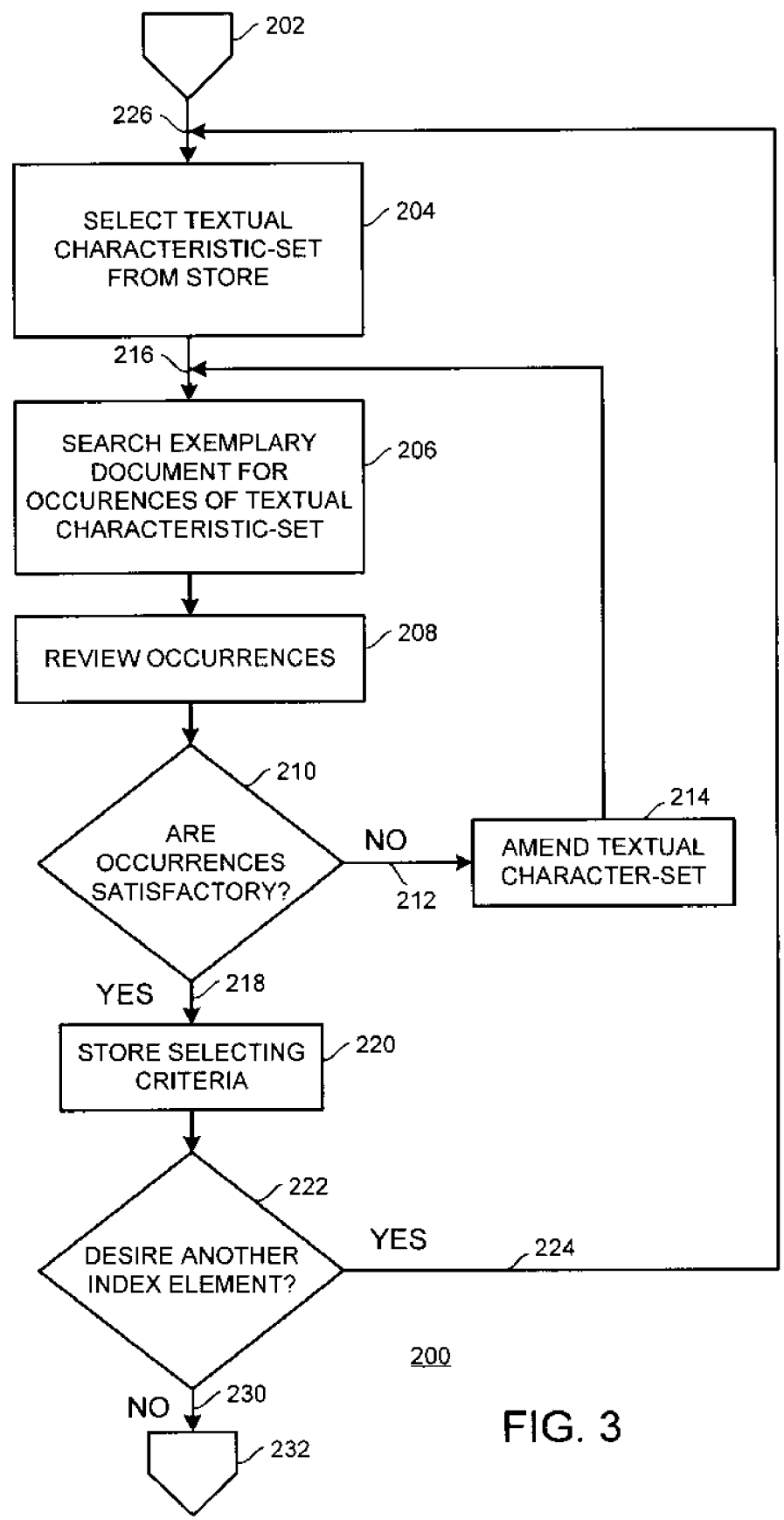
FIG. 3 is a flow chart illustrating a first embodiment of the ascertainment step of the method illustrated in FIG. 2.

FIG. 3 is a flow chart illustrating a first embodiment of the ascertainment step of the method illustrated in FIG. 2. In FIG. 3, an ascertaining process 200 may begin at a process locus 202. Process locus 202 may be related with process locus 103 (FIG. 2). Ascertaining process 200 may continue with selecting a particular representative textual characteristic-set from a store of a plurality of representative textual characteristic-sets (e.g., library store 28; FIG. 1), as indicated by a block 204. The particular representative textual characteristic-set may be related to a selected index element of the at least one index element. Ascertaining process 200 may continue with searching the exemplary document for occurrences of the particular representative textual characteristic-set, as indicated by a block 206. Ascertaining process 200 may continue with reviewing the occurrences to determine whether the occurrences satisfactorily identify an instance of the selected index element, as indicated by a block 208.

Ascertaining process 200 may then pose a query whether the occurrences satisfactorily identify an instance of the selected index element, as indicated by a query block 210. If the occurrences do not satisfactorily identify an instance of the selected index element, ascertaining process 200 may proceed from query block 210 via a NO response line 212 and the particular representative textual characteristic-set may be amended, as indicated by a block 214. Ascertaining process 200 thereafter may amend the particular representative textual characteristic-set, may return to a process locus 216 and steps represented by blocks 206, 208, 210 may be repeated. If the occurrences satisfactorily identify an instance of the selected index element, ascertaining process 200 may proceed from query block 210 via a YES response line 218 and the particular representative textual characteristic-set may be stored, as indicated by a block 220. Ascertaining process 200 may continue with deciding whether another selected index element of the at least one index element is desired, as indicated by a query block 222.

If another selected index element is desired, ascertaining process 200 may proceed from query block 220 via a YES response line 224 to a process locus 226 and steps represented by blocks 204, 206, 208, 210, 220 may be repeated. If another selected index element is not desired, ascertaining process 200 may proceed from query block 220 via a NO response line 230 and ascertaining process 200 may proceed to a process locus 232. Process locus 232 may be related with process locus 105 (FIG. 2).

Figure 4:
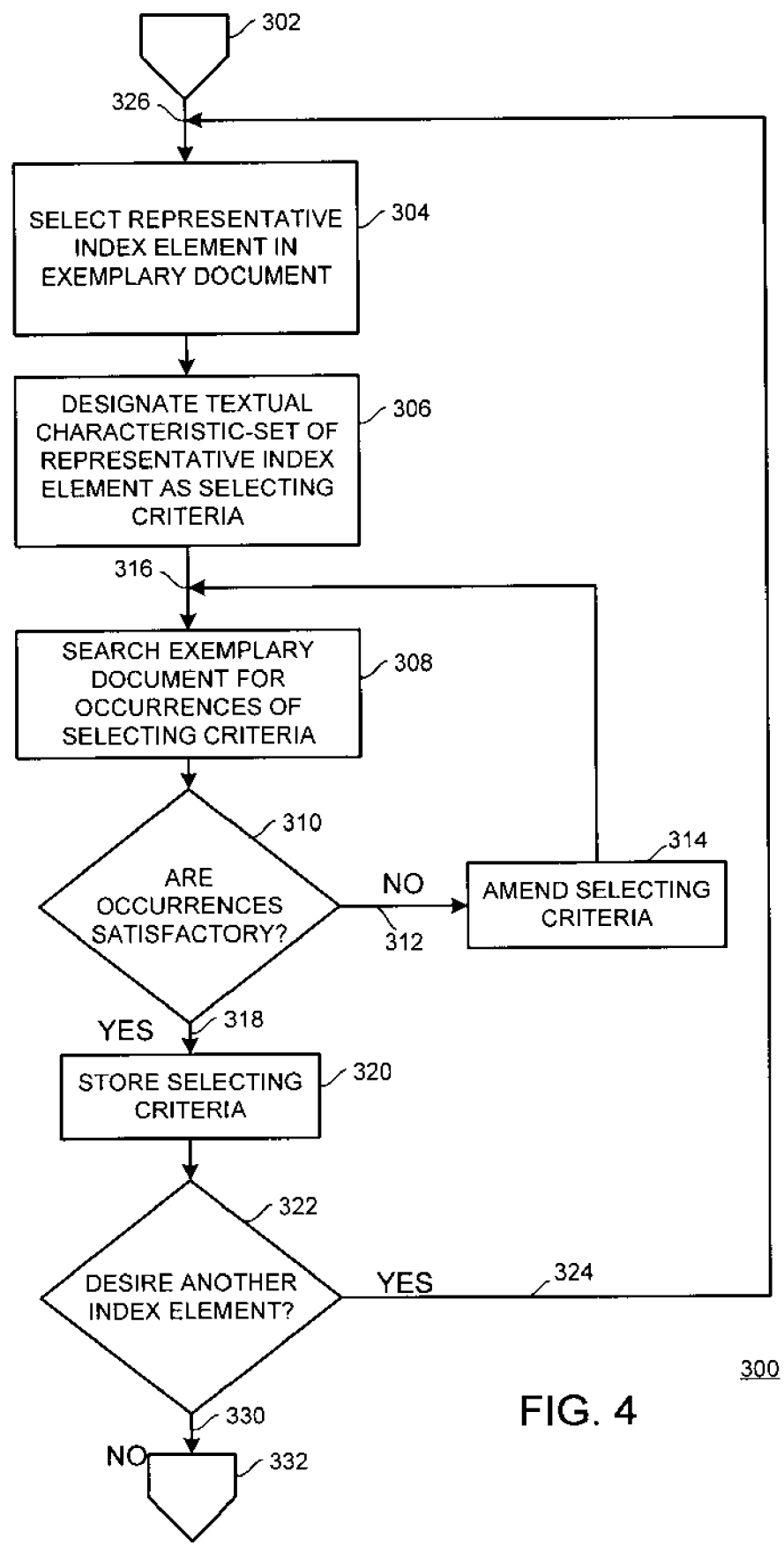
FIG. 4 is a flow chart illustrating a second embodiment of the ascertainment step of the method illustrated in FIG. 2.

FIG. 4 is a flow chart illustrating a second embodiment of the ascertainment step of the method illustrated in FIG. 2. In FIG. 4, an ascertaining process 300 may begin at a process locus 302. Process locus 302 may be related with process locus 103 (FIG. 2). Ascertaining process 300 may continue with selecting a particular representative index element in the exemplary document (e.g., exemplary document 22; FIG. 1), as indicated by a block 304. Ascertaining process 300 may continue with designating a selected textual characteristic-set of the particular representative index element as selecting criteria for the representative index element, as indicated by a block 306. Ascertaining process 300 may continue with searching the exemplary document for occurrences of the selecting criteria, as indicated by a block 308.

Ascertaining process 300 may then pose a query whether the occurrences satisfactorily identify an instance of the representative index element, as indicated by a query block 310. If the occurrences do not satisfactorily identify an instance of the representative index element, ascertaining process 300 may proceed from query block 310 via a NO response line 312 and the selecting criteria may be amended, as indicated by a block 314. Ascertaining process 300 thereafter may return to a process locus 316 and steps represented by blocks 306, 308, 310 may be repeated. If the occurrences satisfactorily identify an instance of the representative index element, ascertaining process 300 may proceed from query block 310 via a YES response line 318 and the selected criteria may be stored, as indicated by a block 320. Ascertaining process 300 may continue with deciding whether another representative index element is desired, as indicated by a query block 322.

If another representative index element is desired, ascertaining process 300 may proceed from query block 320 via a YES response line 324 to a process locus 326 and steps represented by blocks 304, 306, 308, 310, 320 may be repeated. If another representative index element is not desired, ascertaining process 300 may proceed from query block 320 via a NO response line 330 and ascertaining process 300 may proceed to a process locus 332. Process locus 332 may be related with process locus 105 (FIG. 2).

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method creating a tool for generating a plurality of index elements relating to contents of an examined document; said examined document being configured according to a format; the method comprising:

(a) ascertaining a plurality of textual characteristic-sets of an exemplary document for identifying said plurality of index elements; said exemplary document being configured according to said format; each respective textual characteristic-set of said plurality of textual characteristic-sets being embodied in a respective textual expression in said format; each said respective textual expression identifying a respective index element of said plurality of index elements; said ascertaining being effected by:

(1) selecting a particular representative textual characteristic-set from a store of said plurality of representative textual characteristic-sets; said particular representative textual characteristic-set being related to a selected index element of said plurality of index elements;

(2) searching said exemplary document for occurrences of said particular representative textual characteristic-set;

(3) reviewing said occurrences to determine whether said occurrences satisfactorily identify an instance of said selected index element;

(4) if said occurrences do not satisfactorily identify an instance of said selected index element, amending said particular representative textual characteristic-set to present an amended textual characteristic-set, and repeating steps (2) through (3) using said amended textual characteristic-set;

(5) if said occurrences satisfactorily identify an instance of said selected index element, storing said particular representative textual characteristic-set and deciding whether another selected index element of said plurality of index elements is desired;

(6) if another selected index element is desired, repeating steps (1) through (5); and (7) if another selected index element is not desired, terminating said ascertaining;

(b) expressing said plurality of textual characteristic-sets in a computer-executable code; and (c) saving said computer-executable code for effecting said creating.

2. A method creating a tool for generating a plurality of index elements relating to contents of an examined document as recited in claim 1 wherein said storing includes saving said particular representative textual characteristic-set in a data store available for employment during later practices of the method.

3. A method creating a tool for generating a plurality of index elements relating to contents of an examined document as recited in claim 2 wherein said storing includes saving said particular representative textual characteristic-set for inclusion in said computer-executable code.

4. A method creating a tool for generating a plurality of index elements relating to contents of an examined document; said examined document being configured according to a format; the method comprising:

(a) ascertaining a plurality of textual characteristic-sets of an exemplary document for identifying said plurality of index elements; said exemplary document being configured according to said format; each respective textual characteristic-set of said plurality of textual characteristic-sets being embodied in a respective textual expression in said format; each said respective textual expression identifying a respective index element of said plurality of index elements; said ascertaining being effected by:

(1) selecting a particular representative index element in said exemplary document;

(2) designating a selected textual characteristic-set of said particular representative index element as selecting criteria for said representative index element;

(3) searching said exemplary document for occurrences of said selecting criteria;

(4) reviewing said occurrences to determine whether said occurrences satisfactorily identify an instance of said representative index element;

(5) if said occurrences do not satisfactorily identify instances of said representative index element, amending said selecting criteria to present an amended selecting criteria and repeating steps (3) through (4) using said amended selecting criteria;

(6) if said occurrences satisfactorily identify instances of said representative index element, storing said selecting criteria and determining whether another representative index element is desired;

(7) if another representative index element is desired, repeating steps (1) through (6); and (8) if another representative index element is not desired, terminating said ascertaining;

(b) expressing said plurality of textual characteristic-set in a computer-executable code; and (c) saving said computer-executable code for effecting said creating.

5. A method creating a tool for generating a plurality of index elements relating to contents of an examined document as recited in claim 4 wherein said storing includes saving said selecting criteria in a data store available for employment during later practices of the method.

6. A method creating a tool for generating a plurality of index elements relating to contents of an examined document as recited in claim 5 wherein said storing includes saving said selecting criteria for inclusion in said computer-executable code.

7. A method creating a tool for generating a plurality of index elements relating to contents of an examined document; said examined document being configured according to a format; the method comprising:

(a) ascertaining a first textual characteristic-set of an exemplary document for identifying a first index element for inclusion in said index; said exemplary document being configured according to said format; said first textual characteristic-set being embodied in a first textual expression in said format; said first textual expression identifying said first index element; said ascertaining being effected by:

(1) selecting a particular representative textual characteristic-set from a store of a plurality of representative textual characteristic-sets; said particular representative textual characteristic-set being related to a selected index element in said index;

(2) searching said exemplary document for occurrences of said particular representative textual characteristic-set;

(3) reviewing said occurrences to determine whether said occurrences satisfactorily identify an instance of said selected index element;

(4) if said occurrences do not satisfactorily identify an instance of said selected index element, selecting a next particular representative textual characteristic-set from said store of a plurality of representative textual characteristic-sets; said next particular representative textual characteristic-set being related to a selected index element in said index, and repeating steps (2) through (3) using said next textual characteristic-set;

(5) if said occurrences satisfactorily identify an instance of said selected index element, storing said particular representative textual characteristic-set and deciding whether another selected index element of said index is desired;

(6) if another selected index element is desired, repeating steps (1) through (5); and (7) if another selected index element is not desired, terminating said ascertaining;

(b) expressing said first textual characteristic-set in a computer-executable code;

(c) saving said computer-executable code in a data store;
(d) if another index element is desired for inclusion in said index; ascertaining a next textual characteristic-set for identifying a next index element for inclusion in said index; said next textual characteristic-set being embodied in a next textual expression in said format; said next textual expression identifying said next index element; and repeating steps (b) through (c); and
(e) if no other index element is desired for inclusion in said index; terminating the method.

8. A method creating a tool for generating a plurality of index elements relating to contents of an examined document as recited in claim 7 wherein said storing includes saving said particular representative textual characteristic-set in a data store available for employment during later practices of the method.

9. A method creating a tool for generating a plurality of index elements relating to contents of an examined document as recited in claim 8 wherein said storing includes saving said particular representative textual characteristic-set for inclusion in said computer-executable code.

10. A method creating a tool for generating a plurality of index elements relating to contents of an examined document; said examined document being configured according to a format; the method comprising:
   (a) ascertaining a first textual characteristic-set of an exemplary document for identifying a first index element for inclusion in said index; said exemplary document being configured according to said format; said first textual characteristic-set being embodied in a first textual expression in said format; said first textual expression identifying said first index element; said ascertaining being effected by:
      (1) selecting a particular representative index element in said exemplary document;
      (2) designating a selected textual characteristic-set of said particular representative index element as selecting criteria for said representative index element;
      (3) searching said exemplary document for occurrences of said selecting criteria;
      (4) reviewing said occurrences to determine whether said occurrences satisfactorily identify an instance of said representative index element;
      (5) if said occurrences do not satisfactorily identify instances of said representative index element, amending said selecting criteria to present an amended selecting criteria and repeating steps (3) through (4) using said amended selecting criteria;
      (6) if said occurrences satisfactorily identify instances of said representative index element, storing said selecting criteria and determining whether another representative index element is desired;
      (7) if another representative index element is desired, repeating steps(1) through (6); and
      (8) if another representative index element is not desired, terminating said ascertaining;
   (b) expressing said first textual characteristic-set in a computer-executable code;
   (c) saving said computer-executable code in a data store;
   (d) if another index element is desired for inclusion in said index; ascertaining a next textual characteristic-set for identifying a next index element for inclusion in said index; said next textual characteristic-set being embodied in a next textual expression in said format; said next textual expression identifying said next index element; and repeating steps (b) through (c); and
   (e) if no other index element is desired for inclusion in said index; terminating the method.

11. A method creating a tool for generating a plurality of index elements relating to contents of an examined document as recited in claim 10 wherein said storing includes saving said selecting criteria in a data store available for employment during later practices of the method.

12. A method creating a tool for generating a plurality of index elements relating to contents of an examined document as recited in claim 11 wherein said storing includes saving said selecting criteria for inclusion in said computer-executable code.

13. An apparatus creating a tool for generating a plurality of index elements relating to contents of an examined document; said examined document being configured according to a format; the apparatus comprising:
   (a) an ascertaining unit operating with an exemplary document to ascertain at least one textual characteristic-set of said exemplary document; said at least one textual characteristic-set being related with said plurality of index elements; said exemplary document being configured according to said format;
   (b) an encoding unit coupled with said ascertaining unit; said encoding unit expressing said at least one textual characteristic-set in a computer-executable code;
   (c) a data store coupled with said encoding unit; said data store saving said computer-executable code for effecting said creating; and
   (d) a textual element store coupled with said ascertaining unit; said textual element store containing a plurality of representative textual characteristic-sets; said ascertaining being effected by:
      (1) selecting a particular representative textual characteristic-set from said textual element store; said particular representative textual characteristic-set being related to a selected index element of said plurality of index elements;
      (2) searching said exemplary document for occurrences of said particular representative textual characteristic-set;
      (3) reviewing said occurrences to determine whether said occurrences satisfactorily identify an instance of said selected index element;
      (4) if said occurrences do not satisfactorily identify an instance of said selected index element, selecting a next particular representative textual characteristic-set from said textual element store; said next particular representative textual characteristic-set being related to a selected index element in said index, and repeating steps (2) through (3) using said amended textual characteristic-set;
      (5) if said occurrences satisfactorily identify an instance of said selected index element of said at least one index element, storing said particular representative textual characteristic-set and deciding whether another selected index element of said index is desired;
      (6) if another selected index element is desired, repeating steps (1) through (5);
      (7) if another selected index element is not desired, terminating said ascertaining.

14. An apparatus creating a tool for generating a plurality of index elements relating to contents of an examined document as recited in claim 13 wherein said storing includes saving said particular representative textual characteristic-set in said textual element store for selective employment during later practices of the method.

15. An apparatus creating a tool for generating a plurality of index elements relating to contents of an examined document as recited in claim 14 wherein said storing includes saving said particular representative textual characteristic-set for inclusion in said computer-executable code.

16. An apparatus creating a tool for generating a plurality of index elements relating to contents of an examined document; said examined document being configured according to a format; the apparatus comprising:
  (a) an ascertaining unit operating with an exemplary document to ascertain at least one textual characteristic-set of said exemplary document; said at least one textual characteristic-set being related with said plurality of index elements; said exemplary document being configured according to said format;
  (b) an encoding unit coupled with said ascertaining unit; said encoding unit expressing said at least one textual characteristic-set in a computer-executable code; and
  (c) a data store coupled with said encoding unit; said data store saving said computer-executable code for effecting said creating; said ascertaining being effected by:
    (1) selecting a particular representative index element in said exemplary document;
    (2) designating a selected textual characteristic-set of said particular representative index element as selecting criteria for said representative index element;
    (3) searching said exemplary document for occurrences of said selecting criteria;
    (4) reviewing said occurrences to determine whether said occurrences satisfactorily identify an instance of said representative index element;
    (5) if said occurrences do not satisfactorily identify instances of said representative index element, amending said selecting criteria to present an amended selecting criteria and repeating steps (3) through (4) using said amended selecting criteria;
    (6) if said occurrences satisfactorily identify instances of said representative index element, storing said selecting criteria and determining whether another representative index element is desired;
    (7) if another representative index element is desired, repeating steps(1) through (6); and
    (8) if another representative index element is not desired, terminating said ascertaining

17. An apparatus creating a tool for generating a plurality of index elements relating to contents of an examined document as recited in claim 16 wherein said storing includes saving said selecting criteria in a data store coupled with said ascertaining unit for selective employment during later practices of the method.

* * * * *